July 26, 1960     J. R. BOYD     2,946,541

AIRFOIL FLUID FLOW CONTROL SYSTEM

Filed April 11, 1955

INVENTOR.
JOHN R. BOYD
BY Elliott & Pastoriza
ATTORNEYS

United States Patent Office 2,946,541
Patented July 26, 1960

2,946,541
AIRFOIL FLUID FLOW CONTROL SYSTEM
John R. Boyd, 2421 W. Washington Blvd., Venice, Calif.

Filed Apr. 11, 1955, Ser. No. 500,564

1 Claim. (Cl. 244—42)

This invention relates generally to a method and apparatus for controlling the aerodynamic characteristics of a body passing through a fluid, and more particularly, to means for altering the condition of the boundary layer of air immediately adjacent an airflow surface so that the initiation of turbulence and corresponding changes in the lift and drag can be controlled.

It is well known that the total friction to movement of a body through a gas for a given Reynolds number depends largely upon the aerodynamic design of the particular body concerned. On an airfoil, for example, the optimum design is such as to delay the transition from laminar to turbulent airflow along the surface as much as possible as the speed of the airfoil increases. At moderate speeds, it has been possible to eliminate substantially all turbulent flow by proper design; at relatively higher speeds, however, turbulent flow invariably results, with the attendant disadvantage of a sudden increase in the drag and decrease in the lift.

Much of the difficulty at high speeds is a direct result of frictional heating of the airfoil surfaces. This heating causes discontinuities in the layer of air immediately adjacent the hot airfoil surfaces, known as the boundary layer. These discontinuities in the boundary layer upset the normal path of the streamlines characterizing laminar flow. Thus, even with optimum present day aerodynamic designs, it has been difficult if not impossible to eliminate all turbulent flow and thereby reduce friction and attendant high heating at extremely high speeds.

Bearing the above in mind, it is primary object of the present invention to provide a novel method and apparatus for controlling the boundary layer of air on an airflow surface of a body in such a manner as to delay the transition point from laminar to turbulent airflow with increasing Reynolds numbers, whereby the overall resistance to motion and overall friction to movement of the body is greatly reduced at relatively high speeds.

More particularly, an object of the invention is to reduce substantially, aerodynamic heating of an airflow surface by controlling the condition of the boundary layer, whereby much higher Reynolds numbers may be realized without turbulent flow.

Another object is to provide a novel method and apparatus for controlling the boundary layer of an airfoil surface whereby the lift and drag characteristics thereof may be very finely controlled. This fine degree of control renders the present method and apparatus particularly well suited to trim tab airfoils and the like wherein only minor changes in the aerodynamic characteristics are necessary to accomplish a desired control.

These and other objects and advantages of this invention are attained by taking advantage of certain electrical properties characteristically established when a body or airfoil is moved through a gaseous medium. Briefly, when air passes over a body surface, an electrical charge separation occurs leaving the air molecules and particles charged generally positively and the body surface charged negatively. The accumulated negative static charge on the body surface is conventionally dissipated by trailing wires and the like for discharging the free electrons into the atmosphere.

In accordance with the present invention, advantage is taken of the fact that the layers of air immediately adjacent the body surface are electrically charged, by establishing an artificial electric field for guiding the path of the charged layers over the body surface. This artificial electrical field may be of the order of several tens of thousands of volts and is preferably defined by a potential gradient decreasing substantially uniformly from the leading towards the trailing edge of the body. Electrical forces on charged particles entering the central field about and captive with the body are then in the same direction as the streamlines and the result is that the boundary layer of air immediately adjacent the body surface is accelerated in a rearward direction. Layers of air above the boundary layer are then subject to less frictional drag than is the case when the boundary layer is stationary or at best moving very slowly, and thus laminar flow may be maintained at greater speeds than heretofore possible.

In accordance with a further embodiment of the invention, portions of the charged layers of air adjacent the body surface are circulated over the surface whereby their charge is increased in a regenerative manner. The increase in the charge of air renders the established captive electric field more effective in accelerating the boundary layer thereby providing further decreases in the friction to the airflow above the boundary layer and less overall friction to movement of the body. Decreases in the friction will, of course, substantially reduce aerodynamic heating of the airfoil surfaces.

A better understanding of the method and apparatus of this invention will be had by referring to the following detailed description of preferred embodiments in conjunction with the accompanying drawings, in which.

Figure 1:
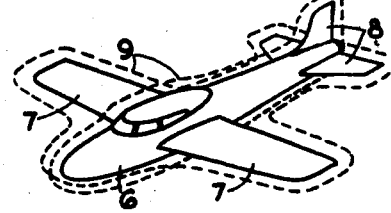
Fig. 1 is a schematic perspective of an airplane.

Referring to Fig. 1 there is shown an airplane comprising a fuselage 6, wings 7, and tail assembly 8. In accordance with the present invention, the total friction to movement of the airplane through the atmosphere is greatly reduced by generating an electric field adjacent all surfaces of the airplane, as schematically illustrated by the dotted lines 9. While Fig. 1 depicts an airplane, it is to be understood that the principles of the invention are applicable to any type of body moving through a fluid medium. The captive electric field 9 preferably surrounds all surfaces of such body.

Figure 2:
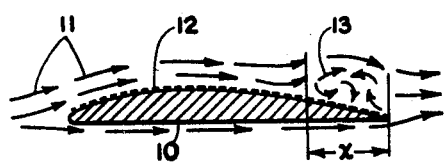
Fig. 2 is a cross section of a typical airfoil schematically illustrating laminar and turbulent airflow.

In order to understand how the electric field 9 reduces friction, reference will now be had to Fig. 2 illustrating a surface portion of a body such as the airplane of Fig. 1.

In Fig. 2, for example, there is shown an airfoil 10 and streamlines 11 representing laminar airflow passing over the surfaces of the airfoil. Immediately adjacent the surfaces of the airfoil, there is a boundary layer of air 12. As the speed of the airfoil through the air increases, the laminar streamlines become turbulent as shown at 13. The point at which this turbulence occurs depends in large part on the physical design of the airfoil.

Figure 3:
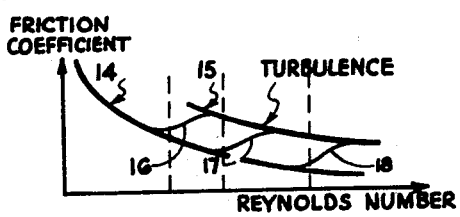
Fig. 3 is a plot of the total friction coefficient of the airfoil of Fig. 2 vs. Reynolds number.

Referring to Fig. 3, for airfoils of the type shown in Fig. 2, the variation of total friction with Reynolds number (which is proportional to speed) is qualitatively represented by the curve 14. At the transition point where the laminar flow becomes turbulent, the friction suddenly increases in an undefined manner. Under turbulent flow conditions, the variation of friction coefficient with increasing Reynolds numbers is qualitatively represented by the curve 15. The transition points as represented by the connecting lines 16, 17, and 18 are generally unpredictable, although they will occur at substantially the same point for any one given set of conditions. It is known however, that slight variations in the condition of the boundary layer 12 will have relatively large effects on the initiation of turbulence. For example, extremely slight physical variations of the airfoil surface adjacent the boundary layer 12 of Fig. 2, such as might be provided by spoilers, could cause the transition point 18 in Fig. 3, for example, to shift back to the point 16. Most of the data presently available in this field has been formulated empirically by wind-tunnel tests.

It will be clear from an inspection of the qualitative curves of Fig. 3, however, that if the transition point can be delayed with increasing Reynolds numbers as much as possible, the friction coefficient will be maintained at minimum values. In accordance with the present invention, this desired delay, or maintenance of laminar flow for as long a period as possible, is attained by electrically controlling the boundary layer of air 12.

Figure 4:
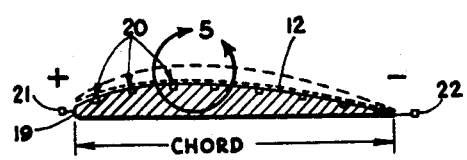
Fig. 4 is a cross section of an airfoil embodying features of the present invention.
Figure 6:
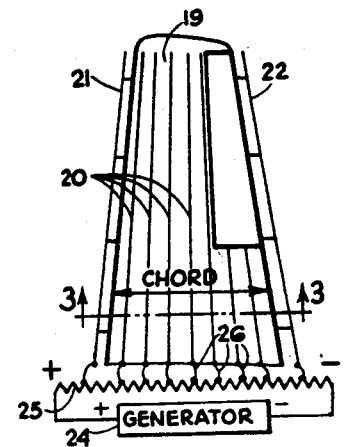
Fig. 6 is a plan view of the airfoil of Fig. 4.
Figure 5:
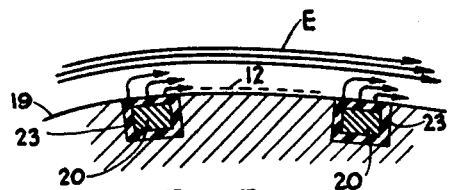
Fig. 5 is an enlarged view of that portion of Fig. 3 enclosed by the circular arrow 5.

Referring to Figs. 4, 5, and 6, there is shown an airfoil 19 and associated boundary layer 12. This boundary layer is controlled by establishing a relatively high intensity electric field immediately adjacent the surface of airfoil 19 by electrical field means in the form of a plurality of electrical conductors 20 running generally transversely of the airfoil cord, as clearly shown in Fig. 6. If desired, a leading conductor outside the physical area of the airfoil 19 as shown at 21 may be provided, and similarly, a trailing conductor 22.

Referring particularly to Fig. 5, each of the conductors 20 is preferably imbedded in the airfoil surface and surrounded by insulation 23. The upper surfaces of the conductors 20 are flush with the airfoil surface to maintain a streamlined configuration. Any suitable means may be employed for establishing an electric field E between the conductors. As shown schematically in Fig. 6, this electric field may be derived from a generator 24 and voltage dividing resistance 25. A plurality of branch conductors 26 connect the leading conductor 21, conductors 20, and trailing conductor 22 to uniformly spaced tap points on the resistance. In this manner, a potential gradient across the airfoil surface decreasing substantially uniformly from the leading towards the trailing edge defines the electric field. The intensity of this field can be varied to give optimum effects. In Fig. 4, this electric field E is represented by the small arrows as extending from one of the conductors 20 to the next adjacent conductor. When all of the conductors are energized with a static potential determined by the tap point on the resistance 25, there results a substantially uniform field across the entire surface.

Laminar airflow streamlines passing over the surface of the airfoil attain a positive charge as described previously. The boundary layer is attracted and guided by the electric field E in a rearward direction with the results of controlling the same. It will be noted that since the charges on the air particles in the boundary layer are positive, and the leading conductor 21 and first few conductors 20 are charged positively by the generator 24, a mutual repulsion between the charges will be established tending to minimize frictional contact between the actual streamlines in the boundary layer, and the airfoil surface. The boundary layer will be repelled to some extent and accelerated rearwardly because of the direction of the electric field. The leading conductor 21 establishes an influencing field before the airflow actually reaches the airfoil surface, and similarly, the trailing conductor 22 maintains the field beyond the trailing edge of the airfoil. These leading and trailing conductors, however, are not essential to the operation and in certain instances may be omitted in the interests of aerodynamic streamlining or performance of the airfoil.

Figure 7:
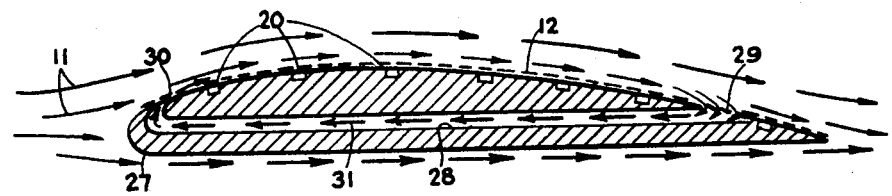
Fig. 7 is an enlarged cross section of another airfoil embodying a further feature of the invention.

Referring now to Fig. 7, there is shown a further modification of an airfoil designed to increase the effect of the electric field E. In this modification, an airfoil 27 is provided with an internal passage 28 running substantially parallel to the cord of the airfoil. This passage is provided with an entrance opening or collector 29 and an exit opening or emitter 30, each opening lying substantially in the plane of the airfoil surface adjacent the boundary layer 12.

When the airflow streamlines 11 engage the leading edge and upper surface of the airfoil, a charge separation occurs, the airflow layers nearest the airfoil surface attaining the greatest charge and the layers further from the surface having less charge. Portions of the highly charged layers are collected in the entrance opening 29 and recirculated through the passage 28 to be emitted through the front exit opening or emitter 30 and again pass over the airfoil surface. Passing over the surface a second time causes a further charge to be accumulated by the air layers, and portions of these layers are again scooped in by the collector opening 29 and again recirculated. The recirculation is maintained because of the relatively high pressure at the opening 29 due to the entrance of ram air and the relatively low pressure at the exit 30 due to the relatively high velocity of the air passing immediately over this opening.

By recirculating the air in the above described manner, a relatively larger static charge is accumulated by the boundary layer, and electrical forces on this charge due to the field E are correspondingly multiplied. The boundary layer is thus further accelerated and repelled by the airfoil surface and therefore, the friction between the air layers and airfoil surface is further decreased. Since the charge layers will follow the force lines defining the electric field E, the layers are, in a manner of speaking, guided over the airfoil surface, and it is found that this action of the electrical field delays the initiation of turbulent flow with increasing speeds.

In specific experiments in which airfoil models incorporating electric field establishing means were placed in an airflow, the attendant drag was found to be substantially reduced when the electric field was present, over the drag value in the absence of such field. Further, it appears that the strength of the electric field is a function of the effectiveness of the drag reduction. The present invention therefore provides a controlled means of altering the lift and drag characteristics of an airfoil over various ranges and would accordingly find excellent application when a fine degree of control is desirable. Additionally, by changing the polarity of the field, it may be possible to initiate turbulence almost immediately and thereby increase the friction and drag on an airfoil. In this manner, the invention would find use as an aerodynamic braking means.

While the invention has been described with reference to only one specific shaped airfoil as illustrated in the accompanying drawings, it is to be understood that the principles thereof are applicable to other shaped bodies through other types of fluid media. The method and apparatus is therefore not to be thought of as limited to the specific embodiments chosen for illustrative purposes.

What is claimed is:

An apparatus for controlling the boundary layer on an airfoil to control the aerodynamic friction offered to airflow thereover by said airfoil, comprising: electric field generating means including a series of conductors imbedded in said airfoil transverse to the cord thereof; means for charging said conductors to given potentials;

an entrance opening adjacent the trailing edge of said airfoil positioned to intercept portions of said airflow, said airfoil having an internal passage running generally parallel to its cord and communicating with said entrance opening; and an exit opening adjacent the leading edge of said airfoil communicating with said internal passage whereby said portions of airflow are recirculated over said airfoil under the influence of said given potentials.

References Cited in the file of this patent

FOREIGN PATENTS

| | | |
|---|---|---|
| 584,585 | Germany | Sept. 21, 1933 |
| 635,784 | Great Britain | Apr. 19, 1950 |
| 1,031,925 | France | Mar. 25, 1953 |